United States Patent Office 3,459,063
Patented Aug. 5, 1969

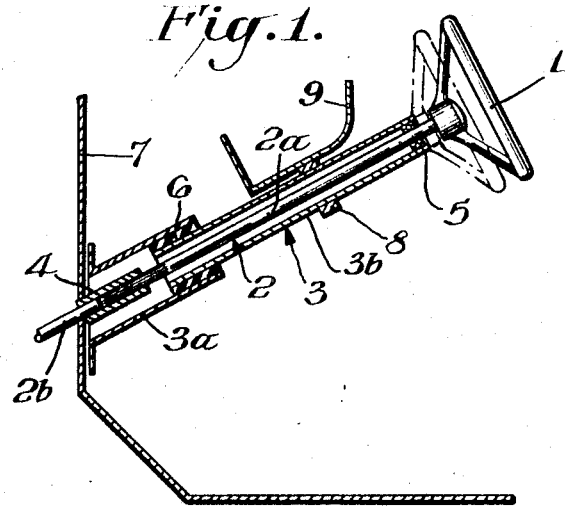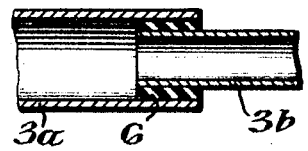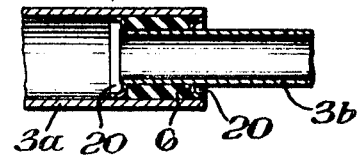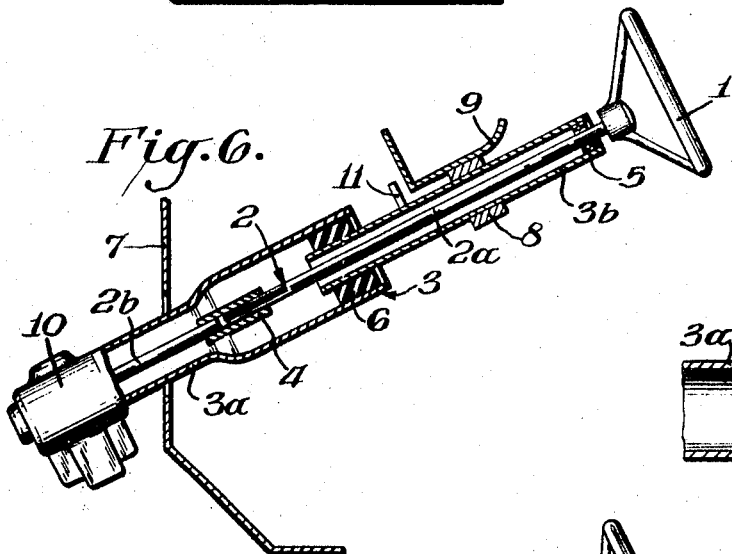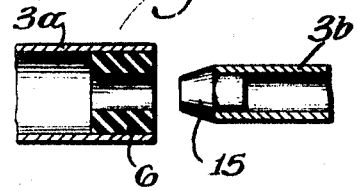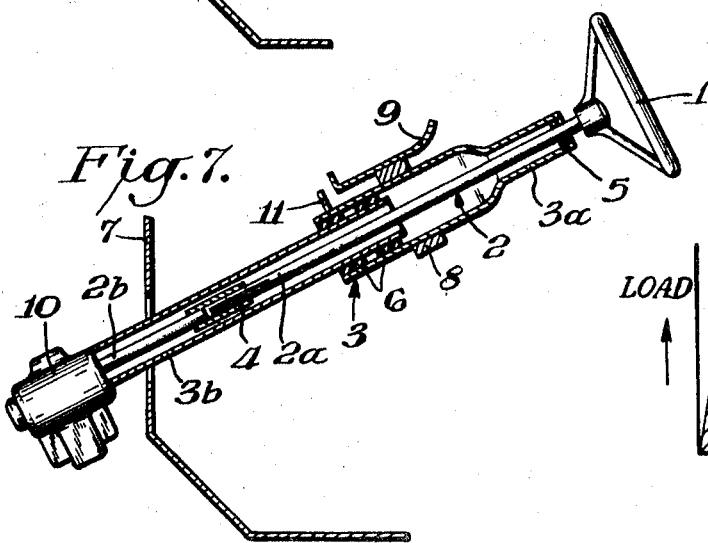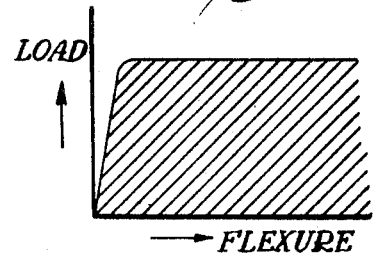

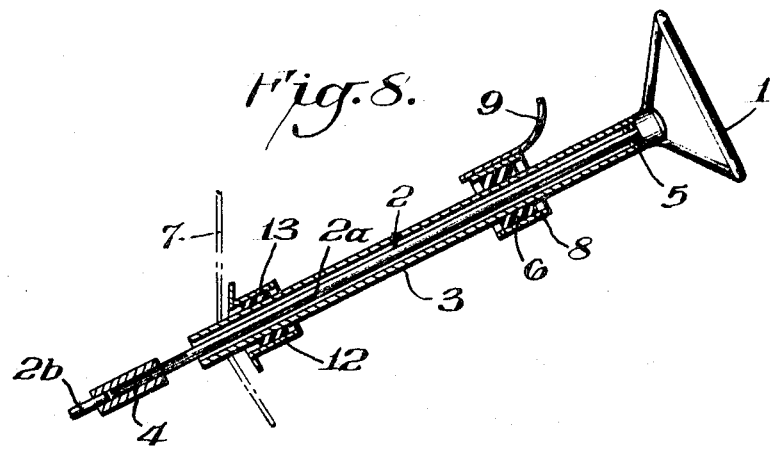
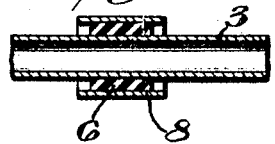
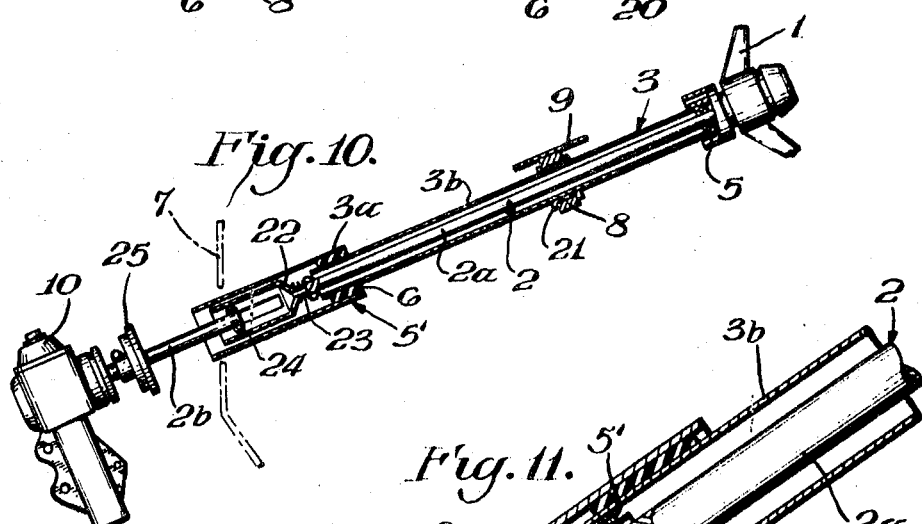
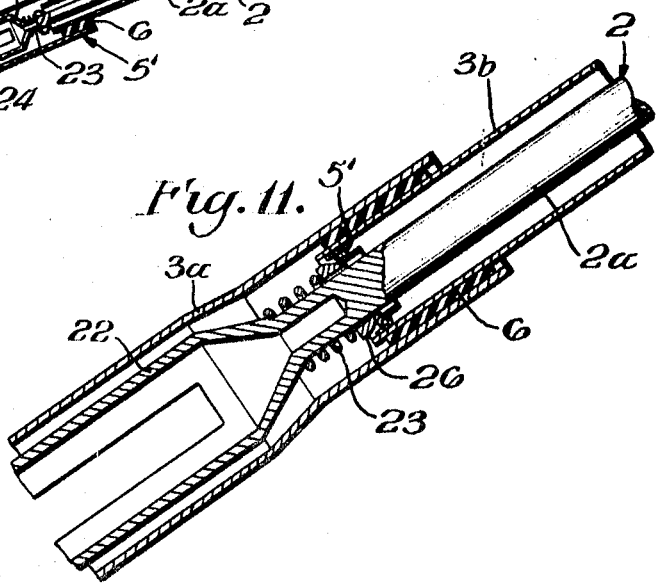

3,459,063
COLLAPSIBLE STEERING COLUMN ASSEMBLY
Akio Numazawa, Toyota, Japan, assignor to Toyota Jidosha Kogyo Kabushiki Kaisha, Toyota, Aichi Prefecture, Japan, a corporation of Japan
Filed Aug. 30, 1967, Ser. No. 664,491
Claims priority, application Japan, Sept. 3, 1966, 41/58,318; Dec. 6, 1966, 41/79,932, 41/79,933
Int. Cl. B62d 1/18
U.S. Cl. 74—492       4 Claims

ABSTRACT OF THE DISCLOSURE

A collapsible column of the type used on motor vehicles is arranged to telescope upon impact thereby eliminating chest injuries to a driver involved in an accident. The upper and lower ends of the column are of different diameters allowing one to fit within the other. At a point where the ends overlap, an annular elastic frictional resistance energy absorbing block means is interposed. This means retains the upper and lower ends in a fixed position in normal use, but upon impact absorbs the frictional resistance energy thereof while allowing the ends of the column to telescope within each other.

Background of the invention

In a conventional steering column assembly for a vehicle, the steering shaft attached to the steering wheel and the steering post rotatably supporting the steering shaft therewithin are constructed not to collapse or extend in the axial direction. In a collision should the driver be thrown forwardly due to inertia of the vehicle coming to a sudden stop, his chest is frequently crushed by the rigid steering wheel and column assembly resulting in a serious injury or costing him his life in the worst case.

If the steering colunm assembly is allowed to displace axially in case of a collision while absorbing energy of such collision in a suitable way, the driver's forward motion would not impale him upon the steering column.

However desirable, this might be for the safety of the driver often space limitations within a vehicle dictate a limited amount of axial movement by the column resulting in a concomitant limitation of the amount of energy absorbed by this movement. The balance of the impact energy is therefore transferred through the colunm to the driver resulting in serious injury. It therefore becomes imperative to have high energy absorptive means to absorb this impact energy yet be sufficiently small to fit within the confines of the column.

Summary of the invention

The present invention relates to an improved collapsible steering column assembly for a vehicle having axially displaceable elements, and more particularly, to improved frictional resistance energy absorbing block means built in said steering column assembly for absorbing frictional resistance energy of axial displacement of said elements upon an application of an axial force load on said steering column assembly.

In the basic embodiment of the collapsible column assembly according to the present invention, the inner steering shaft is divided into an upper section and a lower section which are so connected to each other that they normally rotate together, but upon an application of an axial force on said steering column assembly they are caused to displace axially relative to each other. The outer post which rotatably supports said steering shaft therewithin is also divided into a larger diameter tubular member and a smaller diameter tubular member the opposite ends of which are disposed in a partially overlapping relation with elastic frictional resistance energy absorbing block means interposed therebetween. This elastic energy absorbing means is so disposed that as the larger and smaller diameter tubular members displace axially relative to each other upon impact, the energy absorbing means absorbs the energy of the axial displacement of the post members. The novel elastic energy absorbing meons built in the steering shaft assembly according to the present invention can effectively absorb a maximum collision energy with a minimum force and a short stroke by virtue of the unique construction and arrangement of the energy absorbing means which are of simple annular members formed of rubber, rubber-like material or similar elastic material.

Therefore, one object of the present invention is to provide a collapsible steering column assembly for a vehicle which has one or more novel and improved elastic energy absorbing means built therewithin.

Another object of the present invention is to provide a novel and improved collapsible steering column assembly particularly for a motor vehicle which has one or more elastic energy absorbing means built therewithin, and each of the energy absorbing means comprising an annular elastic member formed of rubber, rubber-like material or similar elastic material and disposed between the overlapping ends of the two part multi-diameter column assembly post so that the energy absorbing means may absorb the energy of axial displacement of the two post members relative to each other upon an application of axial force load on said steering column assembly.

A further object of the present invention is to provide a collapsible steering colunm assembly in which rigid restraining rings are disposed at and against the opposite ends of the elastic energy absorbing means in the partially overlapping ends of the larger and smaller diameter members of the post so that the elastic energy absorbing means may be prevented from axial displacement and the post may be prevented from bending in the overlapping connection between its larger and smaller diameter members.

A still further object of the present invention is to provide a novel and improved steering column assembly in which a stop is provided on the post for allowing the post to axially displace a substantial distance in one direction, but to restrict axial displacement of the post in the other direction.

The above and other objects and advantages of the present invention will be more readily apparent to those skilled in the art from the following description when read in connection with the accompanying drawings in which:

Brief description of the drawings

FIG. 1 is a longitudinal cross-sectional view of a preferred form of collapsible steering column assembly, according to the present invention showing the steering column assembly as mounted within the body of a vehicle;

FIG. 2 is a fragmentary enlarged sectional view of the telescopic connection between the larger diameter tubular member and smaller diameter tubular member of the outer mast or post of said steering column assembly with an elastic energy absorbing means interposed therebetween;

FIG. 3 is a fragmentary enlarged sectional view of a modified form of telescopic connection between said larger and smaller diameter tubular members of the outer mast or post with an elastic energy absorbing means and restraining rings interposed therebetween;

FIG. 4 is a fragmentary enlarged and exploded sectional view illustrating one manner in which said larger and smaller diameter tubular members of the outer mast or post are connected to each other in a telescopic relation;

FIG. 5 is a graph plotting the relative displacement of the post members along the horizontal axis against the axial force loading on the column assembly along the vertical axis;

FIG. 6. is a longitudinal cross-sectional view of a modified form of collapsible steering column assembly according to the present invention showing the steering column assembly as mounted within the body of a vehicle;

FIG. 7 is a longitudinal cross-sectional view of a further modified form of collapsible steering column assembly according to the present invention showing the steering column assembly as mounted within the body of a vehicle;

FIG. 8 is a longitudinal cross-sectional view of another modified form of collapsible steering column assembly according to the present invention showing the steering column assembly as mounted within the body of a vehicle;

FIG. 9a is a fragmentary enlarged sectional view of one form of energy absorbing arrangement employed in conjunction with the embodiment of FIG. 8;

FIG. 9b is a fragmentary enlarged sectional view of of another form of energy absorbing arrangement employed in conjunction with the embodiment of FIG. 8;

FIG. 10 is a longitudinal cross-sectional view of a further modified form of collapsible steering column assembly according to the present invention showing the steering column assembly as mounted within the body of a vehicle;

FIG. 11 is an enlarged sectional view of the upper part of the lower tubular member in FIG. 10.

In order to simplify illustration of embodiments, the identical and corresponding parts of the several embodiments are indicated by the same reference numerals throughout the various figures and in order to simplify the disclosure of the invention, repeating explanation of the construction and arrangement of the identical and corresponding component parts of the embodiments are eliminated.

Referring now to the figures of the accompanying drawings and more particularly, to FIG. 1 thereof in which a preferred form of collapsible steering column assembly according to the present invention is shown as mounted within the body of a vehicle 7. The collapsible steering column assembly generally includes an outer mast or post 3 which supports therewithin a telescopic steering shaft 2. The outer post 3 consists of a lower or larger diameter tubular member 3a and an upper or smaller diameter tubular member 3b which are connected to each other at their adjacent or opposite end portions in a partially overlapping and telescopic relation with an annular elastic energy absorbing means 6 such as a rubber ring disposed under preloaded condition therebetween. The annular energy absorbing means allows axial collapse of the collapsible parts of the steering column and absorb energy of the axial force loading to impart controlled resistance to such collapse. The steering shaft 2, which is supported rotatably by ball bearings 5 provided in the outer mast 3, has a steering wheel 1 secured at the upper end and consists of an upper shaft section 2a and a lower shaft section 2b which are connected to each other in an axially spaced relation by means of a sleeve-like coupling 4 which has a plurality of longitudinal ridges in its inner periphery for fitting into splines formed in the outer periphery of the lower end portion of the upper shaft section 2a. However, the ridge and spline arrangement may be reversed as desired. As shown in FIG. 1, the opposing ends of the upper and lower shaft sections 2a and 2b are normally held in a spaced relation against axial displacement relative to each other by the coupling 4, but the two shaft sections may be allowed to axially displace relative to each other when the steering column assembly is subjected to an axial force load as in the event of vehicle collision.

The lower end portion of the outer mast 3 and more particularly, the lower end portion of the larger diameter tubular member 3a thereof is secured to the restraining toe plate assembly 7 of the vehicle body against displacement relative thereto in either axial direction. The smaller diameter tubular member 3b is supported on the bottom of the instrument panel structure 9 of the vehicle body by means of a clamp 8 for axial sliding movement in low frictional contact with the inner surface of the clamp 8 in either axial direction relative to the larger diameter tubular member 3a upon application of an axial force load on the steering column.

Various embodiments of the annular energy absorbing means 6 between the overlapping opposite end portions of the larger and smaller diameter tubular members 3a and 3b are contemplated by this invention. Two of such embodiments are exemplified in FIGS. 2 and 3 of the drawings. First, referring to FIG. 2, the annular energy absorbing means 6 is disposed in a preloaded condition between the overlapping opposite end portions of the larger and smaller diameter tubular members 3a and 3b. In this embodiment, when the steering column assembly is subjected to an axial force load, the larger and smaller diameter tubular members 3a and 3b telescope relative to each other, developing a sliding or frictional resistance between the inner periphery of the larger diameter tubular member 3a and the outer periphery of the smaller diameter tubular member 3b due to the resiliency of the preloaded energy absorbing means 6. This sliding or friction resistance absorbs the energy of this axial displacement of the tubular members 3a and 3b relative to each other. The annular energy absorbing means 6 may be secured to the inner periphery of the larger diameter member 3a or the outer periphery of the smaller diameter member 3b by means of a suitable adhesive or by baking. When the annular energy absorbing means 6 if secured to the inner periphery of member 3a, the energy of the relative axial displacement of the larger and smaller diameter members 3a and 3b relative to each other is absorbed by sliding or friction resistance between the outer periphery of the smaller diameter member 3b and the inner periphery of the annular energy absorbing means 6. Likewise, when the annular energy absorbing means 6 is secured to the outer periphery of the outer end portion of the smaller diameter member 3b, the energy of such relative axial displacement of the tubular members is absorbed by sliding friction resistance which will be developed between the inner periphery of the larger diameter member 3a and the outer periphery of the annular energy absorbing means 6. The material for the annular energy absorbing means 6 is not limited to rubber, but other elastic materials such as rubberlike materials and synthetic resins may be equally employed for forming the energy absorbing means 6.

One method of assembling the larger and smaller diameter tubular members 3a and 3b of the outer mast or post 3, is shown in FIG. 4. Prior to the assembly of the two members the annular energy absorbing means 6 is previously press-fit within the inner end portion of the larger diameter member 3a and secured to the inner periphery of the member 3a by means of adhesive or baking. A cylindrical jig 15 having a frusto-conical shaped head is then inserted into the outer end portion of the smaller diameter member 3b with the head disposed outside of the member 3b. Thereafter, the outer end portion of the smaller diameter member 3b having the jig supported therein is inserted into the cavity of the annular energy absorbing means 6 thereby to complete the energy absorbing connection among the two members 3a and 3b and the annular means 6 in a desired arrangement.

In one alternative way for assembling the larger and smaller diameter tubular members 3a and 3b, the annular energy absorbing means 6 is secured to both the inner periphery of the inner end portion of the larger diameter tubular member 3a and the outer periphery of the outer end portion of the smaller diameter tubular member 3b by means of adhesive or baking. In such an embodiment, the annular energy absorbing means 6 may be disposed under either preloaded or non-compressed condition between the two tubular members 3a and 3b. In this embodiment, the shearing stress on the material of the annular energy absorbing means 6 absorbs the energy of the relative axial displacement of the two tubular members 3a and 3b. The amount of energy to be absorbed by the energy absorbing means 6 varies depending upon the magnitude of the load and flexing ability of the material constituting the annular energy absorbing means 6 and such energy absorbing amount may be suitably selected in accordance with the size of the steering column assembly in which the annular energy absorbing means will be employed. FIG. 5 illustrates one example of the amount of energy to be absorbed by the annular energy absorbing means 6 and in this figure, the cross-hatched area represents the absorbed energy amount for a particular axial displacement of the larger and smaller diameter tubular members 3a and 3b relative to each other.

Since the overlapping opposite end portions of the larger and smaller diameter tubular members 3a and 3b of the outer mast 3 are connected to each other by means of the annular elastic energy absorbing means 6, when the steering column assembly is subjected to an external force load in either axial direction the mast is liable to bend at the connection between the two tubular members 3a and 3b. This seriously effects the operation of the steering shaft 2 rotatably supported therein rendering the steering wheel 1 somewhat inoperative. According to the present invention, such a disadvantage can be effectively eliminated by the unique arrangement shown in FIG. 3. As seen from this figure, rigid restraining rings 20 have an inner diameter substantially corresponding to the outer diameter of tubular member 3b and an outer diameter corresponding to the inner diameter of tubular member 3a. These rings 20 are placed at opposite ends of the energy absorbing means 6 in an abutting relation thereto so that they may effectively prevent the outer mast 3 from bending at the point of connection between the two tubular members 3a and 3b even when the mast is subjected to an external impact force. Because of this rigidity, the operation of the steering wheel 1 remains unhindered even when the outer post 3 telescopes upon impact. The provision of such rigid rings 20 is especially advantageous in the event that the rigidity of the entire construction of the outer mast 3 is insufficient.

With arrangement of the steering column assembly as described above, in the event of a collision, even if the driver is thrown forward due to the inertia forces upon impact, to the extent that his chest bumps against the steering wheel 1, the steering column assembly is allowed to collapse in a downward axial direction while the energy of such collapsible movement of the column assembly is absorbed by the annular energy absorbing means 6. Accordingly, the injury to the driver is minimized, and it can be said that this novel steering column assembly is quite useful and practical in view of the safety features mentioned above.

A modified form of steering column assembly according to the present invention is illustrated in FIG. 6. As seen in this figure, the lower larger diameter tubular member 3a includes a reduced diameter section having substantially the same diameter as that of the upper smaller diameter tubular member 3b and the lower end of the reduced diameter section is secured to the steering gear box 10 while the upper smaller diameter tubular member 3b has the same configuration as that of the embodiment in FIG. 1. The upper tubular member 3b is provided in the outer periphery adjacent the lower end thereof with a stop or engaging piece 11 which is normally adjacent the rear surface of the instrument panel structure 9. This stop 11 limits the travel of tubular member 3b in the axially upward direction so that the outer mast 3 may be allowed to displace in the downward direction by a substantial distance, but be restricted in its upward movement.

FIG. 7 illustrates a further modified form of steering column assembly according to the present invention. The embodiment of FIG. 7 is susbtantially the same as that shown in FIG. 6 except that the position of the larger diameter tubular member 3a and the smaller diameter member 3b is reversed, that is, the larger diameter tubular member 3a is formed as the upper member and the smaller diameter tubular member 3b is formed as the lower member. In addition, two identical annular energy absorbing means 6 are disposed in an axially spaced relation in the connection between the two tubular members 3a and 3b. Also in the two modified forms of steering column assemblies of FIGS. 6 and 7, the annular energy absorbing means 6 may be positioned in any one of the various ways as described in connection with the preferred embodiment of FIG. 1 and the operation of the energy absorbing means of these modified forms of steering column assemblies of FIGS. 6 and 7 is the same as that of the the energy absorbing means of the preferred embodiment of FIG. 1.

Assuming that due to a collision of the vehicle, the driver's chest was driven against the steering wheel with a sharp blow, in the embodiment of FIG. 6 the upper shaft section 2a having the steering wheel 1 secured and the upper smaller diameter tubular member 3a are caused to axially displace together in the downward direction or retractive direction, but in this case the annular elastic energy absorbing means 6 absorbs the energy of such collapsing movement of the steering column elements through either frictional action or shearing action depending upon the manner in which the energy absorbing means is positioned in the connection.

In the event of collision of the vehicle wherein the steering column assembly of FIG. 6 is mounted, if the fore portion of the vehicle was badly damaged to the extent that the fore vehicle portion was crushed and the breaking stress due to such crushing was transmitted to the steering gear box 10 to push the box upwards, the pushed gear box then causes the larger diameter tubular member 3a to displace upwardly or rearwardly by a distance depending upon the magnitude of the breaking stress, but the upward or rearward axial displacement of the smaller diameter tubular member 3b is restrained by the abutment of the stop or engaging piece 11 thereon against the rear surface of the instrument panel structure 9. And therefore, the thus transmitted energy of the breaking stress through the steering gear box 10 by the vehicle collision is absorbed by the energy absorbing means 6 in the same manner as mentioned in connection with the preceding embodiment. The same effect will be also obtained in the embodiment of FIG. 7 although the construction and arrangement of the embodiment is somewhat different from those of the embodiment of FIG. 6.

Thus, in each of the embodiments of FIG. 6 and FIG. 7, as mentioned above in connection with the embodiment of FIG. 1, in the event of vehicle collision even if the driver's chest was driven against the steering wheel 1 with a sharp blow, the steering wheel 1 is allowed to gradually collapse in accordance with the amount of energy developed through such impact while the energy absorbing means is absorbing such energy. Even in such an extreme case as in which the collision is so serious to cause the breaking stress to extend to the steering gear box 10, the breaking stress will not develop into a force which will push the steering wheel 1 toward the driver.

Also in the embodiments of FIG. 6 and FIG. 7, the tendency of the outer mast 3 to bend upon impact can be effectively prevented by the rigid rings 20 such as shown in FIG. 3.

FIG. 8 illustrates a still further modified form of collapsible steering column assembly according to the present invention and in this embodiment, as distinct from the two-part construction outer masts or posts of the preceding embodiments, the outer mast 3 of the embodiment of FIG. 8 comprises a single tubular element. The outer mast 3 is supported adjacent the upper end thereof on the bottom of the instrument panel structure 9 of the vehicle body by means of a cylindrical clamp 8 which is in turn secured to the instrument panel structure 9 and an annular energy absorbing means 6 is disposed between the clamp 8 and outer mast 3 so as to absorb energy of axial displacement of the outer mast in either direction in the event of an application of an axial force load thereon. The outer mast 3 is further supported in a second cylindrical clamp 12 at a point spaced downwardly from the clamp 8 and the clamp 12 is in turn secured to the toe panel structure 7 of the vehicle body by a suitable means (not shown). A second ring 13 formed of any suitable low friction bearing material is disposed between the second clamp 12 and outer mast or post 3 so that the outer mast may be allowed to frictionally displace in either axial direction with smoothness upon an application of an axial force load thereon without developing any high frictional force. The low friction ring 13 unlike the energy absorbing means 6 is not adapted to positively absorb energy of such axial displacement of the outer mast 3. However, it should be understood that the arrangement of the first rubber ring 6 and second low friction bearing ring 13 may be reversed and the rubber ring 6 may be disposed between the second clamp 12 and outer mast 3 while the low friction bearing material ring 13 may be disposed between the first clamp 8 and outer mast 3 as desired whereby the energy may be absorbed at the point of the second clamp 12 along the outer mast 3 while such energy may not be positively absorbed at the point of the first clamp 8 along the same outer mast. Alternatively, a rubber ring 6 may be disposed between the first clamp 8 and outer mast 3 as well as between the second clamp 12 and the same outer mast, respectively, within the scope of the present invention. In such an arrangement energy is adapted to be positively absorbed in the first and second support means. Although the arrangement for the first clamp 8 and rubber ring 6 only is illustrated in FIGS. 9a and 9b, such an arrangement may be equally applicable to the assembly of the second clamp 12 and low friction material ring 13 or rubber ring 6 because there is no difference between the two support arrangements except that between the materials for forming the rings 6 and 13. The above-mentioned three types of energy absorbing arrangements may be optionally selected depending upon various factors involved. Such factors are, for example, the amount of energy to be absorbed, design specifications of the steering column assembly and others.

Various ways may be contemplated for positioning the annular energy absorbing element or elastic ring 6 in the first clamp 8 and/or second clamp 12 in order that the element may absorb energy of displacement of the outer mast 3 in either axial direction. In one of such positioning ways, as shown in FIG. 9a the rubber ring 6 is positioned between the outer mast 3 and first clamp 8 under preloaded condition. In this way of positioning for the rubber ring 6, when the outer mast 3 is caused to displace in either axial direction the preloaded rubber ring 6 resiliently resists to such the displacement of the mast 3 thereby to develop a frictional resistance force between the outer periphery of the mast and the inner periphery of the rubber ring 6 so as to absorb energy of the axial displacement of the outer mast 3. In another way for positioning the rubber ring, the rubber ring 6 may be secured to the inner peripheral surface of fist clamp and/or second clamp by means of adhesive or baking as desired. In assembling the rubber ring 6 to the clamp 8 or 12, the same procedure as practiced in assembling the rubber ring 6 to the clamp 8 in the embodiment of FIG. 1 as (explained in connection with FIG. 3) can be followed.

Alternatively, the rubber ring 6 may be secured to both the inner periphery of the first clamp 8 and/or second clamp 12 and the outer periphery of the outer mast 3 by means of adhesive or baking. In this way for positioning, the rubber ring 6 may be positioned under preloaded or no load condition between the outer mast and clamp. In either way for positioning as mentioned above, the rubber ring 6 may be so arranged that the shearing stress of the material of the rubber ring 6, which was developed therein in response to axial displacement of the mast 3 in either axial direction, absorbs energy of such axial displacement of the outer mast 3. The amount of energy to be absorbed by the rubber ring 6 is determined depending upon the load and flexing characteristics of the material of the rubber ring 6 and may be optionally selected by taking the size of the steering column assembly into consideration. The amount of energy to be absorbed by the rubber ring 6 in the embodiment of FIG. 8 is as illustrated in FIG. 6.

Also in the embodiment of FIG. 8, since the outer mast 3 is supported in the first clamp 8 and second clamp 12 with the rubber ring 6 interposed or low friction bearing material 13 therebetween, when an external force is applied on the mast, the mast may be sometimes displaced out of its proper mounting position in the first clamp and/or second clamp due to improper or insufficient attachment to the steering shaft 2, for example, such will result in adverse effects on the steering shaft 2. Such difficulty may be overcome by the provision of the rigid rings 20 at the opposite ends of the rubber ring 6 associated with the first clamp 8 and/or second clamp 12 between the first clamp 8 and outer mast 3 and/or between the second clamp 12 and outer mast 3 as shown in FIG. 9b. The rigid rings 20 serve to adjust the position of the outer mast 3 at right angles relative to the axis of the mast. The rigid rings 20 also serve to restrict the axial elongation of the rubber ring or rings 6 under an axial force loading thereon so as to stabilize the energy absorbing ability of the rubber ring or rings 6.

Referring to FIG. 10 and FIG. 11 in which a further modified form of steering column assembly according to the present invention is illustrated. The upper shaft section 2a and lower shaft section 2b of the steering shaft 2 are operatively connected to each other at their opposite end portions in an axially spaced relation by means of a bearing and cylindrical member arrangement whereby the shaft sections may be normally allowed to rotate together and are held against axial displacement, but in the event of application of an axial force load on the steering column assembly in either direction the shaft sections 2a and 2b may be allowed to axially displace relative to each other so as to shorten the end-to-end length of the steering shaft 2.

The outer mast or post 3 has substantially the same configuration as that of the outer mast of FIG. 1. The upper tubular member 3b is supported at an intermediate point between the opposite ends thereof on the bottom of the instrument panel structure 9 of the vehicle body by means of a clamp 8 in which low friction bearings 21 are disposed so that the two tubular members may be allowed to axially displace toward or away from each other in the event of an application of an axial force load on the steering column assembly as mentioned above. The upper shaft section 2a is journaled at 5' adjacent the lower end thereof within the outer mast 3. A hollow cylindrical member 22 is disposed around the lower shaft section 2b in a circumferentially spaced relation to the shaft section within the lower tubular member 3a. The upper end portion of the cylindrical member 22 is reduced in diameter and the reduced diameter upper end portion is connected by means of the tapered shoulder portion of the cylindrical member to the main body of the member. A coiled spring 23 is disposed on the reduced diameter upper end portion of the hollow cylindrical member 22 in a compressed state between the tapered shoulder portion of the cylindrical member 22 and the axially slidable taper ring 26 which is disposed on bearings 5' in the lower end of the upper tubular member 3b so that the shaft 2a is supported rotatably and non-swingingly at its upper end and lower end respectively by bearings 5 and 5'. A universal joint 24 is disposed on the lower shaft section 2b within the hollow cylindrical member 22 and the universal joint is adapted to maintain the lower shaft section 2b in alignment with the upper shaft section 2a. Another conventional universal joint 25 is mounted on the lower shaft section 2b between the lower end of the lower tubular member 3a of the outer mast 3 and the steering gear box 10 for the purpose well known in the art. As shown in the previous embodiments, energy absorbing means 6 is placed between the mating ends of the upper and lower tubular members 3a and 3b, and performs the functions noted above.

It should be understood that in the embodiments illustrated in FIGS. 1 and 8, the upper and lower steering shaft sections are shown as being connected by the sleeve-like coupling which engages either one shaft section in the conventional spline means, but such connecting means may be replaced by any other conventional connecting means suitable for the purpose without departing from the spirit of the present invention.

What is claimed is:

1. A collapsible steering column assembly comprising a steering shaft having an upper section and a lower section; means for coupling said upper and lower shaft sections together so that the two shaft sections rotate together but can axially displace relative to each other; a post surrounding said steering shaft, said post having a larger diameter tubular member and a smaller diameter tubular member disposed in an axially aligned and a partially overlapping relation at their opposite ends; and elastic frictional resistance energy absorbing block means interposed between said overlapping opposite ends of the larger and smaller diameter tubular members to absorb the energy of axial displacement of the tubular members upon application of an axial force load to the column assembly.

2. The collapsible steering column assembly recited in claim 1, in which rigid restraining rings are provided at and abut against the opposite ends of said elastic frictional resistance energy absorbing block means between said overlapping opposite ends of the larger and smaller tubular members of the post.

3. The collapsible steering column assembly recited in claim 1 wherein the elastic frictional resistance energy absorbing block means is annular.

4. The collapsible steering column assembly recited in claim 1 wherein the elastic frictional resistance energy absorbing block means is under compression.

References Cited
UNITED STATES PATENTS

| | | | |
|---|---|---|---|
| 2,796,953 | 6/1957 | Becker | 188—129 X |
| 2,836,079 | 5/1958 | Salch | 74—493 |
| 2,910,887 | 11/1959 | Helms | 74—493 |
| 2,929,263 | 3/1960 | Felts | 74—493 |

MILTON KAUFMAN, Primary Examiner

U.S. Cl. X.R.

188—129